United States Patent
Lu et al.

(10) Patent No.: US 12,152,531 B1
(45) Date of Patent: Nov. 26, 2024

(54) TRANSMISSION ASSEMBLY FOR AN AIRCRAFT ENGINE ASSEMBLY AND ARCHITECTURE FOR CONTROLLING SAME

(71) Applicant: Pratt & Whitney Canada Corp., Longueuil (CA)

(72) Inventors: Xuening Lu, Oakville (CA); Etienne Plamondon, Candiac (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/228,424

(22) Filed: Jul. 31, 2023

(51) Int. Cl.
  *F02C 3/113* (2006.01)
  *F02C 7/057* (2006.01)
  *F04B 49/06* (2006.01)
  *F04B 49/22* (2006.01)

(52) U.S. Cl.
  CPC .............. *F02C 3/113* (2013.01); *F02C 7/057* (2013.01); *F04B 49/065* (2013.01); *F04B 49/22* (2013.01)

(58) Field of Classification Search
  CPC ........ F02C 7/057; F02C 3/113; F04B 49/065; F04B 49/22; F02D 41/14; F02D 41/1401; F02D 31/007
  See application file for complete search history.

(56) References Cited

U.S. PATENT DOCUMENTS

| | | | |
|---|---|---|---|
| 6,273,076 B1* | 8/2001 | Beck ................... | F02D 13/0234 60/599 |
| 8,572,974 B2 | 11/2013 | Veilleux, Jr. | |
| 9,880,527 B2 | 1/2018 | Li | |
| 10,480,421 B2* | 11/2019 | Meunier ................. | F02C 9/263 |
| 10,634,049 B2* | 4/2020 | Julien ....................... | F02C 7/36 |
| 11,060,449 B2 | 7/2021 | Spierling | |
| 11,279,366 B1* | 3/2022 | Shroll ................... | B60W 10/02 |
| 2013/0260940 A1* | 10/2013 | Lemmers, Jr. .......... | F16H 47/04 475/71 |

(Continued)

FOREIGN PATENT DOCUMENTS

| | | | | |
|---|---|---|---|---|
| CA | 3091487 A1 * | 2/2021 | ............ | F01D 25/20 |
| CN | 112628005 B | 11/2022 | | |

(Continued)

*Primary Examiner* — Craig Kim
(74) *Attorney, Agent, or Firm* — Getz Balich LLC

(57) ABSTRACT

An engine assembly for an aircraft propulsion system includes an engine, a rotational assembly, a gearbox assembly, and a controller. The engine includes an engine shaft. The rotational assembly includes a shaft, a bladed compressor rotor, and a bladed turbine rotor. The shaft interconnects the bladed compressor rotor and the bladed turbine rotor. The gearbox assembly includes a transmission assembly. The transmission assembly includes a first pump, a second pump, and a conduit circuit connecting the first pump and the second pump in fluid communication. The first pump is coupled with the engine shaft. The first pump is a variable displacement pump. The second pump is coupled with the rotational assembly. The controller is configured to identify a target rotation speed for the rotational assembly with an outer closed loop, identify a control signal with an inner closed loop using the target rotation speed, and controlling a displacement of the first pump using the control signal.

16 Claims, 4 Drawing Sheets

(56) References Cited

U.S. PATENT DOCUMENTS

| | | | | |
|---|---|---|---|---|
| 2020/0232432 A1* | 7/2020 | Bergeron | ............ | F02M 37/0052 |
| 2021/0071567 A1* | 3/2021 | Lemmers, Jr. | .......... | F16H 61/42 |
| 2021/0188452 A1* | 6/2021 | Shang | .................... | B64D 31/02 |
| 2022/0090538 A1* | 3/2022 | Carrow | ..................... | F02C 9/40 |
| 2022/0153138 A1* | 5/2022 | Dalum | ................... | B60K 25/06 |
| 2024/0077135 A1* | 3/2024 | Li | ............................ | F16H 39/14 |
| 2024/0084734 A1* | 3/2024 | Minelli | ..................... | F02C 7/14 |

FOREIGN PATENT DOCUMENTS

| | | | | | |
|---|---|---|---|---|---|
| EP | 3557025 | A1 | * | 10/2019 | ............... B64C 1/10 |
| GB | 2620438 | A | * | 1/2024 | ............. B60L 50/50 |
| JP | 2006242051 | A | * | 9/2006 | |

* cited by examiner

TRANSMISSION ASSEMBLY FOR AN AIRCRAFT ENGINE ASSEMBLY AND ARCHITECTURE FOR CONTROLLING SAME

TECHNICAL FIELD

This disclosure relates generally to a hydrostatic transmission assembly for an aircraft engine assembly turbo-compressor and, more particularly, to a control architecture for controlling a hydrostatic transmission assembly.

BACKGROUND OF THE ART

A propulsion system for an aircraft may be configured, for example, as a rotary engine having an integrated turbo-compressor. The propulsion system may include a gear assembly coupling the rotary engine and the turbo-compressor. Various gear assemblies and systems for controlling said gear assemblies are known in the art. While these known gear assemblies and operational systems have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an engine assembly for an aircraft propulsion system includes an engine, a rotational assembly, a gearbox assembly, and a controller. The engine includes an engine shaft, an air intake, and an exhaust. The rotational assembly includes a shaft, a bladed compressor rotor, and a bladed turbine rotor. The shaft interconnects the bladed compressor rotor and the bladed turbine rotor. The bladed compressor rotor forms a portion of a compressor section of the engine assembly. The compressor section is configured to direct a compressed air to the air intake. The bladed turbine rotor forms a portion of a turbine section of the engine assembly. The turbine section is configured to receive an exhaust gas from the exhaust. The gearbox assembly couples the engine shaft and the rotational assembly. The gearbox assembly includes a transmission assembly. The transmission assembly includes a first pump, a second pump, and a conduit circuit connecting the first pump and the second pump in fluid communication. The first pump is coupled with the engine shaft. The first pump is a variable displacement pump. The second pump is coupled with the rotational assembly. The controller includes a processor in communication with a non-transitory memory storing instructions, which instructions when executed by the processor, cause the processor to execute a control architecture for the first pump by identifying a target rotation speed for the rotational assembly with an outer closed loop of the control architecture, identifying a control signal with an inner closed loop of the control architecture using the target rotation speed, and controlling a displacement of the first pump using the control signal.

In any of the aspects or embodiments described above and herein, the second pump may be a fixed displacement pump.

In any of the aspects or embodiments described above and herein, the first pump may include a swash plate. The swash plate may be selectively positionable to vary the displacement of the first pump.

In any of the aspects or embodiments described above and herein, the transmission assembly may further include a variable displacement control assembly. The variable displacement control assembly may include a piston assembly and a control valve. The piston assembly may include a piston coupled with the swash plate. The control valve may be configured to control a position of the piston to selectively position the swash plate.

In any of the aspects or embodiments described above and herein, controlling the displacement of the first pump using the control signal may include directing the control signal to the control valve to control a position of the control valve.

In any of the aspects or embodiments described above and herein, identifying the target rotation speed for the rotational assembly with the outer closed loop may include identifying the target rotation speed using a compressor outlet pressure, a compressor outlet temperature, a compressor inlet pressure, or a compressor inlet temperature for the compressor section.

In any of the aspects or embodiments described above and herein, identifying the target rotation speed for the rotational assembly with the outer closed loop may include identifying the target rotation speed using an engine torque and a rotation speed of the engine shaft.

In any of the aspects or embodiments described above and herein, identifying the control signal with the inner closed loop may include identifying the control signal using a target displacement for the first pump and a speed difference between a target speed for the first pump and a rotation speed of the engine shaft.

In any of the aspects or embodiments described above and herein, identifying the control signal with the inner closed loop may include identifying the control signal using a rotation speed of the rotational assembly and a rotation speed of the engine shaft.

In any of the aspects or embodiments described above and herein, the first pump may be coupled to the engine shaft by a first gear assembly.

In any of the aspects or embodiments described above and herein, the second pump may be coupled to the rotational assembly by a second gear assembly.

According to another aspect of the present disclosure, an engine assembly for an aircraft propulsion system includes an engine, a rotational assembly, a gearbox assembly, and a controller. The engine includes an engine shaft and an air intake. The rotational assembly includes a bladed compressor rotor. The bladed compressor rotor forms a portion of a compressor section of the engine assembly. The compressor section is configured to direct a compressed air to the air intake. The gearbox assembly couples the engine shaft and the rotational assembly. The gearbox assembly includes a transmission assembly. The transmission assembly includes a first pump, a second pump, and a conduit circuit connecting the first pump and the second pump in fluid communication. The first pump is coupled with the engine shaft. The first pump is a variable displacement pump. The second pump is coupled with the rotational assembly. The controller includes a processor in communication with a non-transitory memory storing instructions, which instructions when executed by the processor, cause the processor to execute a control architecture for the first pump by identifying a target rotation speed for the rotational assembly with an outer closed loop of the control architecture using a compressor outlet pressure and a compressor inlet pressure for the compressor section, identifying a control signal with an inner closed loop of the control architecture using the target rotation speed, and controlling a displacement of the first pump using the control signal.

In any of the aspects or embodiments described above and herein, the engine shaft may have a first rotational axis. The bladed compressor rotor may have a second rotational axis. The first rotational axis may be different than the second rotational axis.

In any of the aspects or embodiments described above and herein, the engine assembly may further include a propeller coupled with the engine shaft.

In any of the aspects or embodiments described above and herein, identifying the control signal with the inner closed loop may include identifying the control signal using a target displacement for the first pump and a speed difference between a target speed for the first pump and a rotation speed of the engine shaft.

In any of the aspects or embodiments described above and herein, identifying the target speed for the first pump may include identifying the target speed for the first pump using the target rotation speed for the rotational assembly and the rotation speed of the engine shaft.

According to another aspect of the present disclosure, an engine assembly for an aircraft propulsion system includes an engine, a rotational assembly, a gearbox assembly, and a controller. The engine includes an engine shaft and an air intake. The rotational assembly includes a bladed compressor rotor. The bladed compressor rotor forms a portion of a compressor section of the engine assembly. The compressor section is configured to direct a compressed air to the air intake. The gearbox assembly couples the engine shaft and the rotational assembly. The gearbox assembly includes a transmission assembly. The transmission assembly includes a first pump, a second pump, a conduit circuit connecting the first pump and the second pump in fluid communication, and a variable displacement control assembly. The first pump is coupled with the engine shaft. The first pump includes a swash plate. The swash plate is selectively positionable to vary a displacement of the first pump. The second pump is coupled with the rotational assembly. The variable displacement control assembly includes a piston assembly and a control valve. The piston assembly includes a piston coupled with the swash plate. The control valve is configured to control a position of the piston to selectively position the swash plate. The controller includes a processor in communication with a non-transitory memory storing instructions, which instructions when executed by the processor, cause the processor to execute a control architecture for the first pump by identifying a target rotation speed for the rotational assembly with an outer closed loop of the control architecture using a compressor outlet pressure and a compressor inlet pressure for the compressor section, identifying a control signal with an inner closed loop of the control architecture using the target rotation speed, and controlling a rotational force applied to the rotational assembly by directing the control signal to the control valve to control a position of the control valve, the piston, and the swash plate.

In any of the aspects or embodiments described above and herein, the first pump may be coupled to the engine shaft by a first gear assembly.

In any of the aspects or embodiments described above and herein, the second pump may be coupled to the rotational assembly by a second gear assembly.

In any of the aspects or embodiments described above and herein, the second pump may be a fixed displacement pump.

The present disclosure, and all its aspects, embodiments and advantages associated therewith will become more readily apparent in view of the detailed description provided below, including the accompanying drawings.

DETAILED DESCRIPTION

Figure 1:
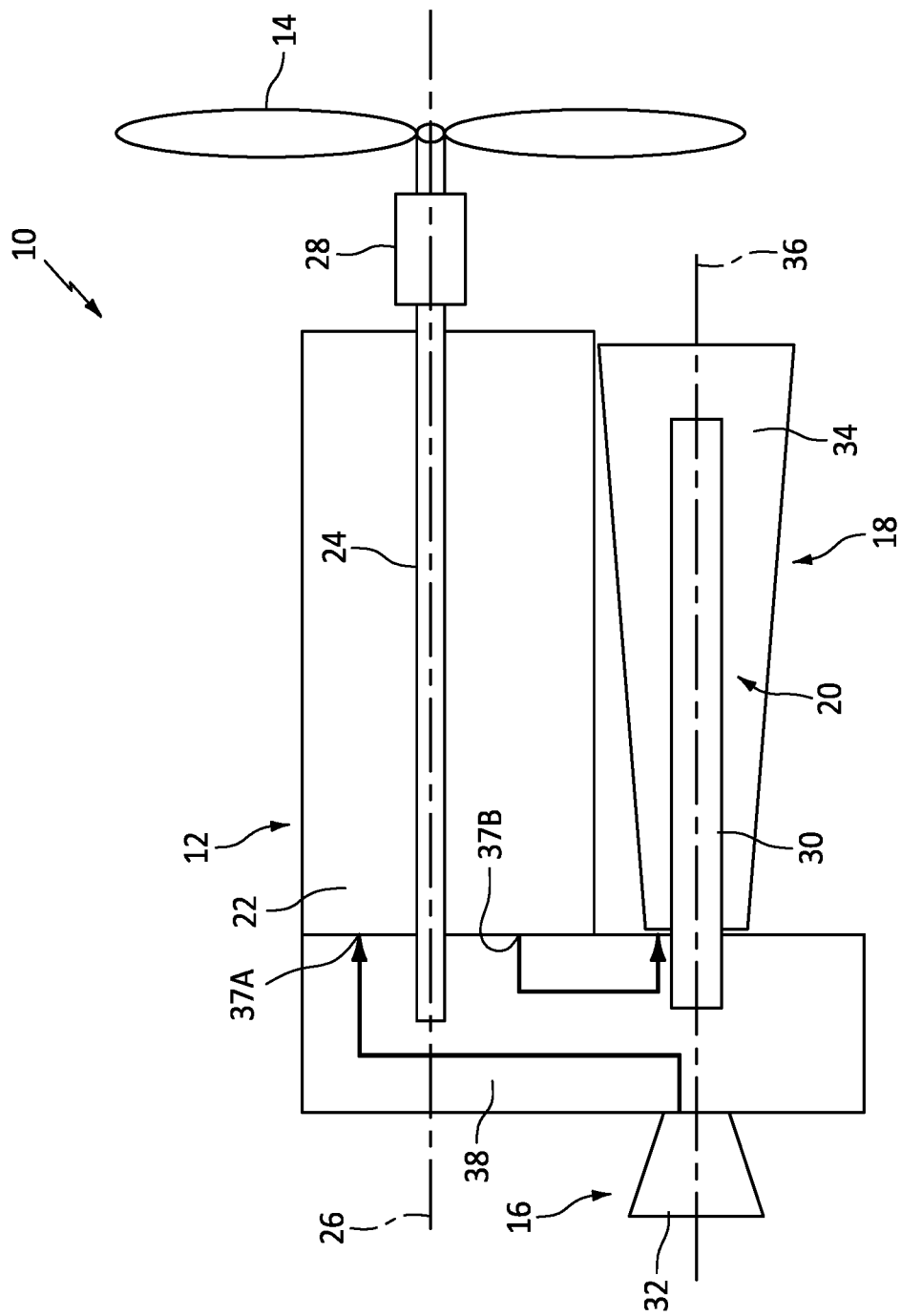
FIG. 1 illustrates a schematic view of an engine assembly, in accordance with one or more embodiments of the present disclosure.

FIG. 1 illustrates an engine assembly 10. The engine assembly 10 may form a portion of a propulsion system for an aircraft. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone). The engine assembly 10 may also form a portion of an auxiliary power unit (APU) or onboard generator for an aircraft. However, the present disclosure is not limited to any particular application of the engine assembly 10. The engine assembly 10 of FIG. 1 includes an engine 12, a rotational load 14, a compressor section 16, a turbine section 18, and a rotational assembly 20.

The engine 12 of FIG. 1 is configured as a rotary intermittent internal combustion engine, which intermittent internal combustion engine includes a rotor assembly 22 and an engine shaft 24. As will be described in further detail, the rotor assembly 22 may be configured, for example, as a Wankel engine in which an eccentric rotor configuration is used to convert fluid pressure into rotational motion.

The rotor assembly 22 is coupled to the engine shaft 24 and configured to drive the engine shaft 24 for rotation about a rotational axis 26. The engine shaft 24 is coupled to the rotational load 14 such that rotation of the engine shaft 24 by the rotor assembly 22 drives rotation of the rotational load 14. The engine shaft 24 may be coupled to the rotational load 14 by a speed-reducing gear assembly 28 of the engine 12. The speed-reducing gear assembly 28 may be configured to effect rotation of the rotational load 14 at a reduced rotational speed relative to the engine shaft 24. The rotational load 14 of FIG. 1 is configured as a propeller. Rotation of the propeller by the engine 12 may generate thrust for an aircraft which includes the engine assembly 10. The engine assembly 10 of the present disclosure may additionally or alternatively be configured to drive other rotational loads, such as, but not limited to, an electrical generator(s), a rotational accessory load, a rotor mast, a compressor, or any other suitable rotational load configuration.

The compressor section 16, the turbine section 18, and the rotational assembly 20 form a turbo-compressor for the engine assembly 10. The rotational assembly 20 of FIG. 1 includes a shaft 30, a bladed compressor rotor 32 of the compressor section 16, and a bladed turbine rotor 34 of the turbine section 18. The shaft 30 is connected to the bladed turbine rotor 34. The shaft 30 and the bladed turbine rotor 34 are mounted to rotation about a rotational axis 36. In operation, ambient air is received by the compressor section 16. The air is compressed by rotation of the bladed compressor rotor 32 and directed to an air intake 37A of the engine 12. Combustion exhaust gases from an exhaust 37B of the engine 12 are directed to the turbine section 18 causing the bladed turbine rotor 34 to rotate and rotationally drive the shaft 30. The shaft 30 is coupled with the bladed compressor rotor 32 by a gearbox assembly 38 of the engine assembly 10 to drive rotation of the bladed compressor rotor 32, as will be discussed below in further detail.

Figure 2:
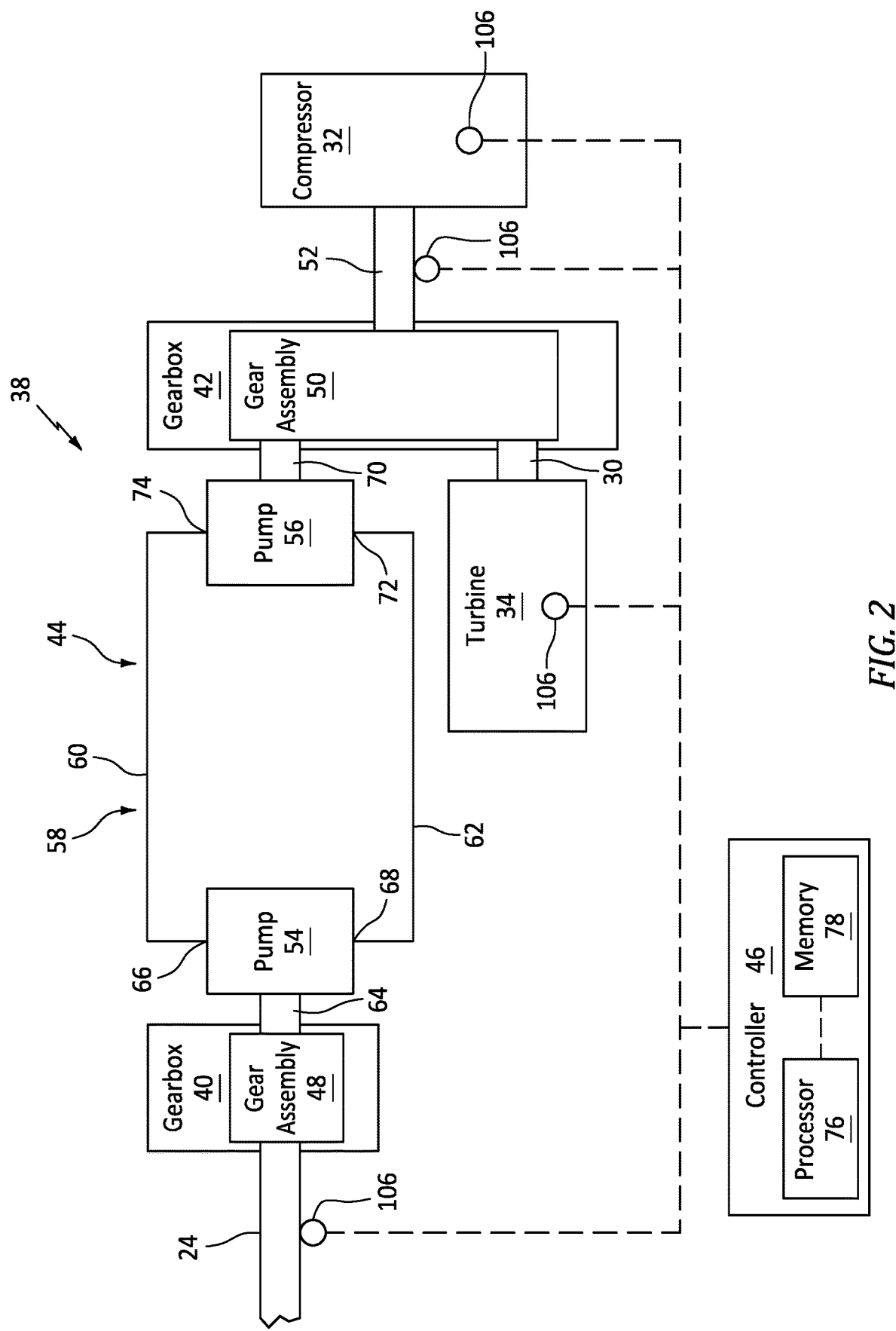
FIG. 2 schematically illustrates a gearbox assembly for the engine assembly of FIG. 1, in accordance with one or more embodiments of the present disclosure.

FIG. 2 schematically illustrates the gearbox assembly 38. The gearbox assembly 38 of FIG. 2 includes a first gearbox 40, a second gearbox 42, and a hydrostatic transmission assembly 44. The gearbox assembly 38 may further include a controller 46.

The first gearbox 40 includes a first gear assembly 48 coupled with the engine shaft 24 and the hydrostatic transmission assembly 44. The first gear assembly 48 may be configured as an epicyclic gear assembly (e.g., a planetary gear assembly). The first gear assembly 48, however, is not limited to any particular gear configuration.

The second gearbox 42 includes a second gear assembly 50 coupled with the rotational assembly 20 (e.g., the shaft 30), the hydrostatic transmission assembly 44, and the bladed compressor rotor 32 (e.g., by an output shaft 52). For example, the second gear assembly 50 may be configured to drive rotation of the bladed compressor rotor 32 in response to input rotational force from the bladed turbine rotor 34 and/or the hydrostatic transmission assembly 44. The second gear assembly 50 may be configured as an epicyclic gear assembly (e.g., a planetary gear assembly). The second gear assembly 50, however, is not limited to any particular gear configuration.

The hydrostatic transmission assembly 44 of FIG. 2 includes a first pump 54 and a second pump 56. The first pump 54 and the second pump 56 are coupled in bi-directional fluid communication by a conduit circuit 58. The conduit circuit 58 includes a first conduit portion 60 (e.g., a supply conduit or a return conduit) and a second conduit portion 62 (e.g., a supply conduit or a return conduit). Each of the first conduit portion 60 and the second conduit portion 62 extends between and to the first pump 54 and the second pump 56. The conduit circuit 58 is configured to direct a fluid from the first pump 54 to the second pump 56 and from the second pump 56 to the first pump 54. The conduit circuit 58 may include any suitable pipe, hose, tube, and/or other conduit to direct the fluid between the first pump 54 and the second pump 56. The fluid for the hydrostatic transmission assembly 44 may be a hydraulic fluid such as, but not limited to, oil or another lubricant. However, the present disclosure is not limited to any particular fluid for the hydrostatic transmission assembly 44.

The first pump 54 is coupled with the first gear assembly 48, for example, by a drive shaft 64. The first pump 54 includes a fluid outlet 66 and a fluid inlet 68. The fluid outlet 66 is coupled with the first conduit portion 60. The fluid inlet 68 is coupled with the second conduit portion 62. The first pump 54 is configured as a variable displacement pump, as will be discussed below in further detail. For example, the first pump 54 may be configured as a variable displacement piston pump.

The second pump 56 is coupled with the second gear assembly 50, for example, by a drive shaft 70. The second pump 56 includes a fluid outlet 72 and a fluid inlet 74. The fluid outlet 72 is coupled with the second conduit portion 62. The fluid inlet 74 is coupled with the first conduit portion 60. The second pump 56 may be configured as a fixed displacement pump. For example, the second pump 56 may be configured as a fixed displacement piston pump. However, the second pump 56 of the present disclosure is not limited to fixed displacement pump configurations and the second pump 56 may alternatively be configured as a variable displacement pump similar to the first pump 54.

In operation, the hydrostatic transmission assembly 44 facilitates extraction and use of excess engine 12 power for the rotational assembly 20 (e.g., the bladed compressor rotor 32), thereby improving the efficiency of the engine assembly 10 (see FIG. 1). Rotation of the engine shaft 24 drives operation of the first pump 54 through the first gear assembly 48. For example, the first gear assembly 48 may drive the drive shaft 64 at a reduced rotational speed relative to the engine shaft 24. In response to the rotation of the drive shaft 64, the first pump 54 pumps the fluid through the conduit circuit 58. The flow of the fluid through the conduit circuit 58 drives the second pump 56 to apply a rotational force to the second gear assembly 50 with the drive shaft 70, thereby driving the bladed compressor rotor 32 cooperatively with the bladed turbine rotor 34. During some operating conditions of the engine assembly 10, the hydrostatic transmission assembly 44 may alternatively facilitate extraction and use of bladed turbine rotor 34 power for the engine shaft 24. Rotation of the shaft 30 drives operation of the second pump 56 through the second gear assembly 50. In response to the rotation of the drive shaft 70, the second pump 56 pumps the fluid through the conduit circuit 58. The flow of the fluid through the conduit circuit 58 drives the first pump 54 to apply a rotational force to the first gear assembly 48 with the drive shaft 64, thereby applying a rotational force to the engine shaft 24.

The controller 46 includes a processor 76 connected in signal communication with memory 78. The processor 76 may include any type of computing device, computational circuit, processor(s), CPU, computer, or the like capable of executing a series of instructions that are stored in the memory 78. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the gearbox assembly 38 to accomplish the same algorithmically and/or by coordination of components of the gearbox assembly 38. The memory 78 may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 46. The controller 46 may include, or may be in communication with, an input device that enables a user to enter data and/or instructions, and may include, or be in communication with, an output device configured, for example to display information (e.g., a visual display or a printer), or to transfer data, etc. Communications between the controller 46 and other electrical and/or electronic components (e.g., controllers, sensors, etc.) may be via a hardwire connection or via a wireless connection. A person of skill in the art will recognize that portions of the controller 46 may assume various forms (e.g., digital signal processor, analog device, etc.) capable of performing the functions described herein.

The controller 46 may form or otherwise be part of an electronic engine controller (EEC) for the engine assembly 10 (see FIG. 1). The EEC may control operating parameters of the engine 12 including, but not limited to, fuel flow, engine shaft 24 torque and/or rotation speed, bladed compressor rotor 32 rotation speed, etc. so as to control an engine power or performance of the engine assembly 10. For example, the EEC may modulate fuel flow to the engine 12 to obtain a desired output power of the engine 12. The controller 46 may include or otherwise be connected in signal communication with one or more sensors to measure and/or determine operational parameters of the engine assembly 10. In some embodiments, the EEC may be part of a full authority digital engine control (FADEC) system.

Figure 3:
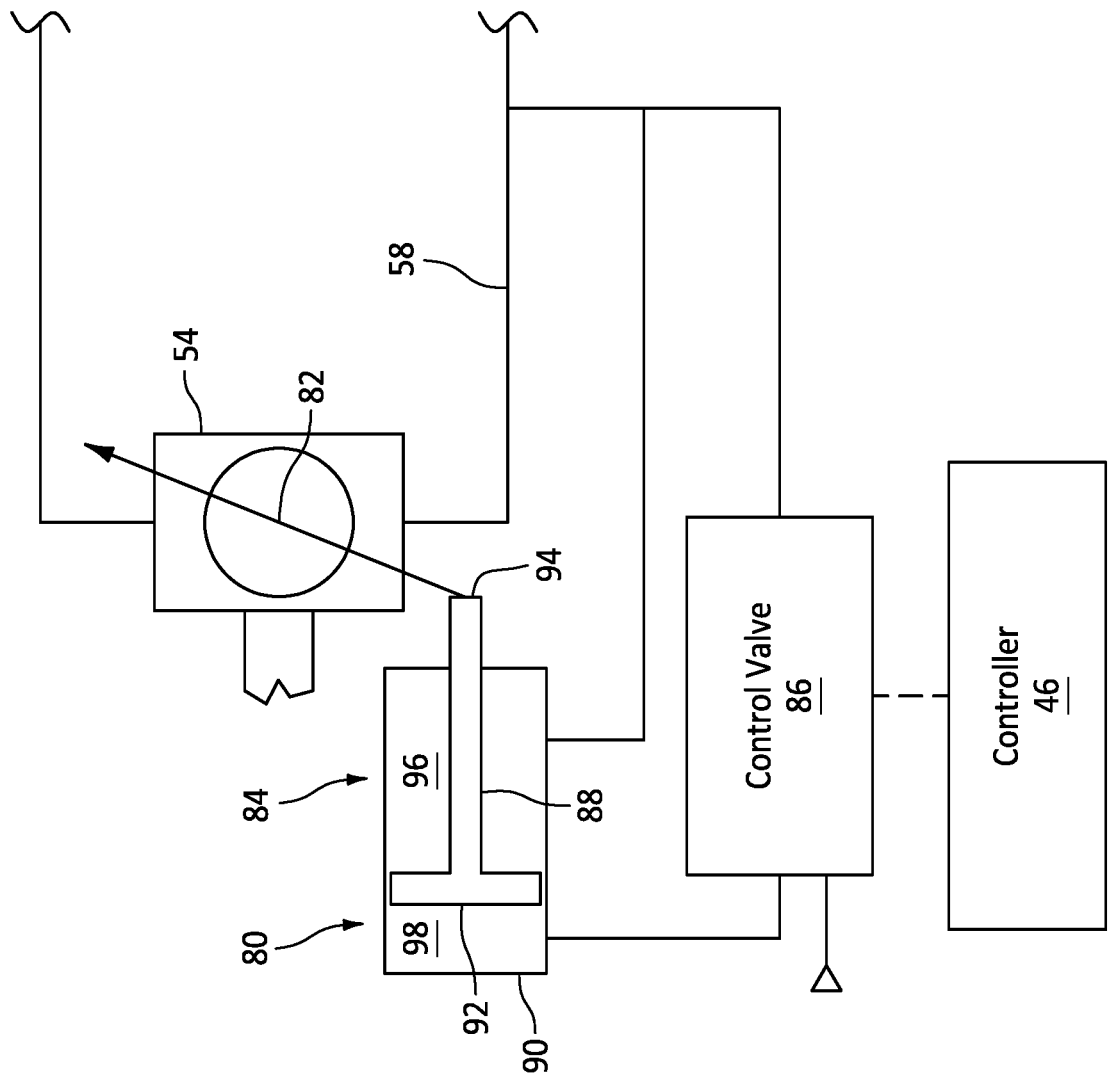
FIG. 3 schematically illustrates a variable displacement pump and a variable displacement control assembly for the gearbox assembly of FIG. 2, in accordance with one or more embodiments of the present disclosure.

FIG. 3 schematically illustrates the first pump 54 and a variable displacement control assembly 80 for the first pump 54. The first pump 54 of FIG. 3 includes a swash plate 82. The swash plate 82 may be selectively positioned (e.g., by the variable displacement control assembly 80) to control a displacement (e.g., a pumping volume) of the first pump 54. For example, the swash plate 82 may control a piston stroke length for the pumping pistons of the first pump 54. The present disclosure, however, is not limited to the use of a swash plate for controlling a variable displacement of the first pump 54, and other configurations of variable displacement pumps may alternatively be used. The variable displacement control assembly 80 of FIG. 3 includes a piston assembly 84 and a control valve 86 (e.g., a servo valve). The piston assembly 84 includes a piston 88 and a housing 90. The piston 88 extends between and to a first piston end 92 and a second piston end 94. The first piston end 92 is disposed within and surrounded by the housing 90. The first piston end 92 and the housing 90 form a first chamber 96 and a second chamber 98. The first chamber 96 is connected in fluid communication with the conduit circuit 58. The second chamber 98 is connected in fluid communication with the control valve 86. The second piston end 94 is disposed at (e.g., on, adjacent, or proximate) the swash plate 82. The control valve 86 is connected in fluid communication with the conduit circuit 58 and the second chamber 98. The control valve 86 is configured to control a pressure of fluid in the second chamber 98 to control a position of the piston 88, and thereby control a position of the swash plate 82. For example, the control valve 86 may be connected in signal communication with the controller 46 and the controller 46 may control a position of the control valve 86 to selectively position the swash plate 82 with the piston 88. The position of the swash plate 82 to control the displacement of the first pump 54 facilitates control of the fluid flow rate in the conduit circuit 58. The present disclosure, however, is not limited to the foregoing exemplary configuration of the first pump 54 and the variable displacement control assembly 80.

Figure 4:
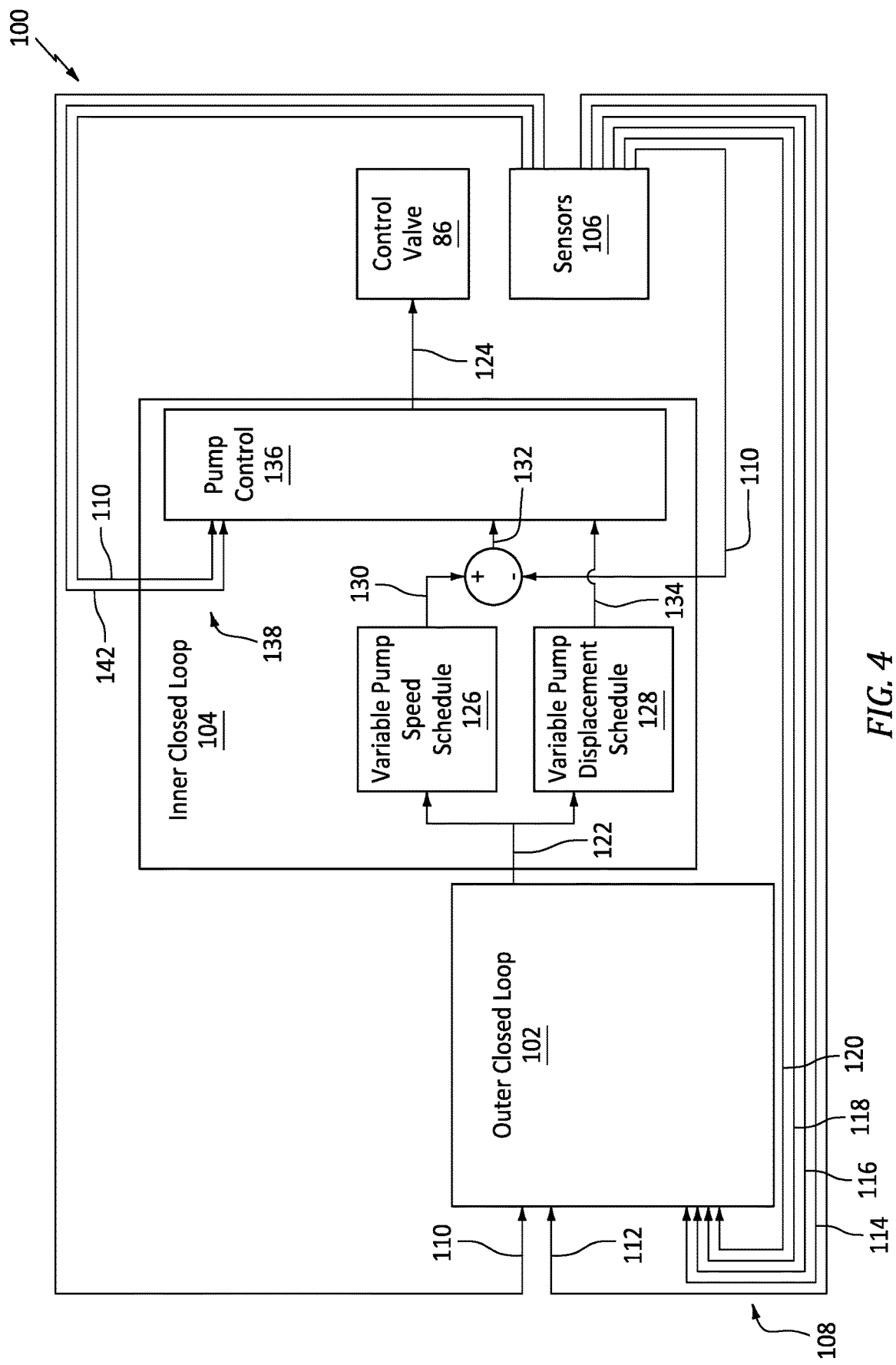
FIG. 4 schematically illustrates a control architecture for controlling a displacement of a variable displacement pump of FIG. 3 using the variable displacement control assembly, in accordance with one or more embodiments of the present disclosure.

FIG. 4 illustrates a diagram of a control architecture 100 for selectively controlling the displacement of the first pump 54 (e.g., with the variable displacement control assembly 80) (see FIGS. 2 and 3). The control architecture 100 may be executed by the controller 46 (e.g., the processor 76) using instructions stored in the memory 78 (see FIG. 2). The control architecture 100 of FIG. 4 includes an outer closed loop 102 and an inner closed loop 104. Referring additionally to FIG. 2, the controller 46 may be connected in signal communication with a plurality of sensors 106 of the engine assembly 10. Examples of the sensors 106 include, but are not limited to, temperature sensors, pressure sensors, rotation speed sensors, torque sensors, or component position sensors. The controller 46 (e.g., the processor 76) may execute the control architecture 100 using signals (e.g., measurement signals) from one or more of the sensors 106.

The outer closed loop 102 is configured to identify a target rotation speed for the rotational assembly 20 (e.g., the bladed compressor rotor 32) (see FIGS. 1 and 2). The outer closed loop 102 receives operational parameter inputs 108 for the engine 12 and the compressor section 16 (e.g., from the sensors 106). The operational parameters 108 include, but are not limited to, an engine (e.g., engine shaft 24) rotation speed 110, an engine (e.g., engine shaft 24) torque or engine power (e.g., engine shaft 24 horsepower) 112, a compressor outlet pressure 114, a compressor outlet temperature 116, a compressor inlet pressure 118, and a compressor inlet temperature 120. The outer closed loop 102 identifies a target rotation speed 122 for the rotational assembly 20 (e.g., the bladed compressor rotor 32) using the operational parameters 108. For example, the outer closed loop 102 may identify the target rotation speed 122 to provide optimal air flow for the engine 12 while preventing the compressor section 16 from exceeding compressor surge and/or compressor stall operating limits. The target rotation speed 122 may be identified from predetermined target rotation speed values (e.g., look-up tables or other databases) stored in memory 78. Alternatively, the target rotation speed may be calculated, modeled, or otherwise determined by the controller 46 using the operating parameters 108. Routine experimentation and/or analysis may be performed by a person of ordinary skill in the art to determine an optimal range of compressor target rotation speeds for the operational parameters 108 discussed above, in accordance with and as informed by one or more aspects of the present disclosure.

The inner closed loop 104 is configured to identify a target fluid flow rate for the first pump 54 and to facilitate generation of a control signal (e.g., an electrical control current) for the control valve 86 to effect the target fluid flow rate of the first pump 54 (see FIGS. 2 and 3). The target fluid flow rate may be understood as a function of speed and displacement for the first pump 54. For example, the controller 46 may execute the inner closed loop 104 and generate a control signal 124 for the control valve 86 to cause the control valve 86 to position the piston 88 and, subsequently, the swash plate 82 to control the displacement and, hence, the fluid flow rate of the first pump 54 (see FIGS. 2 and 3). The fluid flow rate of the first pump 54 may, in turn, control the rotational force applied to the engine 12 or the rotational assembly 20 by the hydrostatic transmission assembly 44, as described above. The inner closed loop 104 applies the target rotation speed 122 from the outer closed loop 102 to a speed schedule 126 for the first pump 54 and a displacement schedule 128 for the first pump 54. The speed schedule 126 identifies a target speed 130 for the first pump 54 using the target rotation speed 122. The inner closed loop 104 identifies a speed difference 132 between the target speed 130 and the engine rotation speed 110. The displacement schedule 128 identifies a target displacement 134 for the first pump 54 using the target rotation speed 122. The inner closed loop 104 applies the speed difference 132 and the target displacement 134 to a pump control element 136 which generates or otherwise controls the generation of the control signal 124 by the controller 46. The pump control element 136 additionally receives operational parameter inputs 138 for the engine 12 and the compressor section 16 (e.g., from the sensors 106). The operational parameters 138 include, but are not limited to, the engine rotation speed 110 and a rotation speed 142 of the rotational assembly 20 (e.g., the bladed compressor rotor 32; see FIG. 1). Using the speed difference 132, the target displacement 134, and the operational parameters 138, the pump control element 136 identifies the control signal 124 (e.g., a magnitude of the control signal 124). The target speed 130, the target displacement 134, and/or the control signal 124 may be identified from predetermined values (e.g., look-up tables or other databases) stored in memory 78. Alternatively, the target speed 130, the target displacement 134, and/or the control signal 124 speed may be calculated, modeled, or otherwise determined by the controller 46. Routine experimentation and/or analysis may be performed by a person of ordinary skill in the art to determine values of the target speed 130, the target displacement 134, and/or the control signal 124 for various configurations and operating conditions of the engine assembly 10, in accordance with and as informed by one or more aspects of the present disclosure.

The configuration outer closed loop 102 and the inner closed loop 104 of the control architecture 100 facilitates feedforward control of the first pump 54 by the pump control element 136, for example, by accounting for changes (e.g., disturbances) in air pressure and air temperature at the compressor section 16 inlet (see FIG. 1). Accordingly, the present disclosure control architecture 100 may provide improved input disturbance compensation for control of the compressor section 16 (e.g., the bladed compressor rotor 32), compared to conventional control systems of which we are aware, while also facilitating prevention or reduced likelihood of compressor surge or compressor stall conditions.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An engine assembly for an aircraft propulsion system, the engine assembly comprising:

an engine including an engine shaft, an air intake, and an exhaust;

a turbo-compressor including a rotational assembly, the rotational assembly includes a turbo-compressor shaft, a bladed compressor rotor, and a bladed turbine rotor, the turbo-compressor shaft interconnects the bladed compressor rotor and the bladed turbine rotor, the bladed compressor rotor forms a portion of a compressor section of the engine assembly, the compressor section is configured to direct a compressed air to the air intake, the bladed turbine rotor forms a portion of a turbine section of the engine assembly, and the turbine section is configured to receive an exhaust gas from the exhaust;

a gearbox assembly coupling the engine shaft and the turbo-compressor shaft, the gearbox assembly includes a transmission assembly, the transmission assembly includes a first pump, a second pump, and a conduit circuit connecting the first pump and the second pump in fluid communication, the first pump is coupled with the engine shaft, the first pump is a variable displacement pump, and the second pump is coupled with the turbo-compressor shaft; and a controller including a processor in communication with a non-transitory memory storing instructions, which instructions when executed by the processor, cause the processor to:

identify a target turbo-compressor rotation speed for the rotational assembly with an outer closed loop using one or more operational parameters of one or both of the engine and the compressor section;

identify a target pump rotation speed for the first pump with an inner closed loop using the target turbo-compressor rotation speed;

identify a speed difference between the target pump rotation speed and an engine rotation speed of the engine shaft with the inner closed loop;

identify a target displacement for the first pump with the inner closed loop using the target turbo-compressor rotation speed and the engine rotation speed;

identify a control signal with the inner closed loop using the speed difference and the target displacement, the control signal corresponding to a displacement of the first pump; and control the displacement of the first pump, using the control signal, to control a fluid flow rate of a fluid pumped by the first pump through the conduit circuit to drive the second pump to apply a rotational force to the turbo-compressor shaft.

2. The engine assembly of claim 1, wherein the second pump is a fixed displacement pump.

3. The engine assembly of claim 1, wherein the first pump includes a swash plate, and the swash plate is selectively positionable to vary the displacement of the first pump.

4. The engine assembly of claim 3, wherein the transmission assembly further includes a variable displacement control assembly, the variable displacement control assembly includes a piston assembly and a control valve, the piston assembly includes a piston coupled with the swash plate, and the control valve is configured to control a position of the piston to selectively position the swash plate.

5. The engine assembly of claim 4, wherein controlling the displacement of the first pump using the control signal includes directing the control signal to the control valve to control a position of the control valve.

6. The engine assembly of claim 1, wherein one or more the operational parameters includes a compressor outlet pressure, a compressor outlet temperature, a compressor inlet pressure, or a compressor inlet temperature for the compressor section.

7. The engine assembly of claim 1, wherein the one or more operational parameters include an engine torque and a rotation speed of the engine shaft.

8. The engine assembly of claim 1, wherein the first pump is coupled to the engine shaft by a first gear assembly.

9. The engine assembly of claim 1, wherein the second pump is coupled to the rotational assembly by a second gear assembly.

10. An engine assembly for an aircraft propulsion system, the engine assembly comprising:

an engine including an engine shaft and an air intake;

a turbo-compressor including a rotational assembly, the rotational assembly includes a bladed compressor rotor, the bladed compressor rotor forms a portion of a compressor section of the engine assembly, and the compressor section is configured to direct a compressed air to the air intake;

a gearbox assembly coupling the engine shaft and the rotational assembly, the gearbox assembly includes a transmission assembly, the transmission assembly includes a first pump, a second pump, and a conduit circuit connecting the first pump and the second pump in fluid communication, the first pump is coupled with the engine shaft, the first pump is a variable displacement pump, and the second pump is coupled with the rotational assembly; and a controller including a processor in communication with a non-transitory memory storing instructions, which instructions when executed by the processor, cause the processor to:

identify a target turbo-compressor rotation speed for the rotational assembly with an outer closed loop using a compressor outlet pressure and a compressor inlet pressure for the compressor section;

identify a target pump rotation speed for the first pump with an inner closed loop using the target turbo-compressor rotation speed;

identify a speed difference between the target pump rotation speed and an engine rotation speed of the engine shaft with the inner closed loop;

identify a target displacement for the first pump with the inner closed loop using the target turbo-compressor rotation speed and the engine rotation speed;

identify a control signal with the inner closed loop using the speed difference and the target displacement, the control signal corresponding to a displacement of the first pump; and control the displacement of the first pump, using the control signal, to control a fluid flow rate of a fluid pumped by the first pump through the conduit circuit to drive the second pump to apply a rotational force to the rotational assembly.

11. The engine assembly of claim 10, wherein the engine shaft has a first rotational axis, the bladed compressor rotor has a second rotational axis, and the first rotational axis is different than the second rotational axis.

12. The engine assembly of claim 10, further comprising a propeller coupled with the engine shaft.

13. An engine assembly for an aircraft propulsion system, the engine assembly comprising:

an engine including an engine shaft and an air intake;

a turbo-compressor including a rotational assembly, the rotational assembly includes a bladed compressor rotor, the bladed compressor rotor forms a portion of a compressor section of the engine assembly, and the compressor section is configured to direct a compressed air to the air intake;

a gearbox assembly coupling the engine shaft and the rotational assembly, the gearbox assembly includes a transmission assembly, the transmission assembly includes a first pump, a second pump, a conduit circuit connecting the first pump and the second pump in fluid communication, and a variable displacement control assembly, the first pump is coupled with the engine shaft, the first pump includes a swash plate, the swash plate is selectively positionable to vary a displacement of the first pump, and the second pump is coupled with the rotational assembly, the variable displacement control assembly includes a piston assembly and a control valve, the piston assembly includes a piston coupled with the swash plate, and the control valve is configured to control a position of the piston to selectively position the swash plate; and a controller including a processor in communication with a non-transitory memory storing instructions, which instructions when executed by the processor, cause the processor to:
- identify a target turbo-compressor rotation speed for the rotational assembly with an outer closed loop using a compressor outlet pressure and a compressor inlet pressure for the compressor section;
- identify a target pump rotation speed for the first pump with an inner closed loop using the target turbo-compressor rotation speed;
- identify a speed difference between the target pump rotation speed and an engine rotation speed of the engine shaft with the inner closed loop;
- identify a target displacement for the first pump with the inner closed loop using the target turbo-compressor rotation speed and the engine rotation speed;
- identify a control signal with the inner closed loop using the speed difference and the target displacement, the control signal corresponding to a displacement of the first pump; and
- control a rotational force applied to the rotational assembly by directing the control signal to the control valve to control a position of the control valve, the piston, and the swash plate to control the displacement of the first pump to control a fluid flow rate of a fluid pumped by the first pump through the conduit circuit to drive the second pump to apply a rotational force to the rotational assembly.

14. The engine assembly of claim 13, wherein the first pump is coupled to the engine shaft by a first gear assembly.

15. The engine assembly of claim 13, wherein the second pump is coupled to the rotational assembly by a second gear assembly.

16. The engine assembly of claim 13, wherein the second pump is a fixed displacement pump.

\* \* \* \* \*